United States Patent
Soricut et al.

(10) Patent No.: US 7,340,388 B2
(45) Date of Patent: Mar. 4, 2008

(54) STATISTICAL TRANSLATION USING A LARGE MONOLINGUAL CORPUS

(75) Inventors: Radu Soricut, Los Angeles, CA (US); Daniel Marcu, Hermosa Beach, CA (US); Kevin Knight, Hermosa Beach, CA (US)

(73) Assignee: University of Southern California, Los Angeles, CA (US)

( * ) Notice: Subject to any disclaimer, the term of this patent is extended or adjusted under 35 U.S.C. 154(b) by 851 days.

(21) Appl. No.: 10/401,134

(22) Filed: Mar. 26, 2003

(65) Prior Publication Data

US 2003/0233222 A1    Dec. 18, 2003

Related U.S. Application Data

(60) Provisional application No. 60/368,071, filed on Mar. 26, 2002.

(51) Int. Cl.
*G06F 17/28* (2006.01)
(52) U.S. Cl. .................... 704/4; 704/2; 704/7
(58) Field of Classification Search ............ 704/4
See application file for complete search history.

(56) References Cited

U.S. PATENT DOCUMENTS

| | | | |
|---|---|---|---|
| 5,477,451 A | | 12/1995 | Brown et al. |
| 5,781,884 A | * | 7/1998 | Pereira et al. ............. 704/260 |
| 6,032,111 A | * | 2/2000 | Mohri ........................ 704/9 |
| 6,393,389 B1 | * | 5/2002 | Chanod et al. .............. 704/7 |
| 7,113,903 B1 | * | 9/2006 | Riccardi et al. ............. 704/4 |

OTHER PUBLICATIONS

Grefenstette, G., "The World Wide Web as a Resource for Example-Based Machine Translation Tasks", *Translating and the Computer 21. Proc. of the Twenty-first International Conference on Translating and the Computer*, London, UK, 21 pages, Nov. 10-11, 1999 (with abstract).
Knight, K., et al., "Translation with Finite-State Devices", *Machine Translation and the Information Soup. Third Conf. of the Assoc. for Machine Translation in the Americas. AMTA'98.*, Langhorne, PA, USA, pp. 421-437, Oct. 28-31, 1998 (with abstract).
Koehn, P., et al., "Estimating Word Translation Probabilities fro Unrelated Monolingual Corpora Using the EM Algorithm", *Proc. 17th Natl. Conf. on Artificial Intelligence (AAAI-2000). Twelfth Innovative Applications Artificial Intelligence Conf. (IAAI-2000)*, Austin, TX, USA, pp. 711-715, Jul. 30-Aug. 3, 2000 (with abstract).
Soricut, R., et al., "Using a Large Monolingual Corpus to Improve Translation Accuracy", *Machine Translation: From Research to Real Users. 5th Conf. of the Assoc. for Machine Translation in the Americas, AMTA 2002. Proc. (Lecture Notes in Artificial Intelligence* vol. 2499), Tiburon, CA, USA, pp. 155-164, Oct. 8-12, 2002 (with abstract).

* cited by examiner

*Primary Examiner*—David Hudspeth
*Assistant Examiner*—Justin W. Rider
(74) *Attorney, Agent, or Firm*—Carr & Ferrell LLP

(57) ABSTRACT

A statistical machine translation (MT) system may use a large monolingual corpus to improve the accuracy of translated phrases/sentences. The MT system may produce a alternative translations and use the large monolingual corpus to (re)rank the alternative translations.

19 Claims, 7 Drawing Sheets

US 7,340,388 B2

STATISTICAL TRANSLATION USING A LARGE MONOLINGUAL CORPUS

CROSS-REFERENCE TO RELATED APPLICATIONS

This application claims priority to U.S. Provisional Application Ser. No. 60/368,071, filed on Mar. 26, 2002, the disclosures of which are incorporated by reference.

ORIGIN OF INVENTION

The research and development described in this application were supported by DARPA under grant number N66001-00-1-8914. The U.S. Government may have certain rights in the claimed inventions.

BACKGROUND

Corpus-based approaches to machine translation usually begin with a bilingual training corpus. One approach is to extract from the corpus generalized statistical knowledge that can be applied to new, unseen test sentences. A different approach is to simply memorize the bilingual corpus. This is called translation memory, and it provides excellent translation quality in the case of a "hit" (i.e., a test sentence to be translated has actually been observed before in the memorized corpus). However, it provides no output in the more frequent case of a "miss".

SUMMARY

In an embodiment, a statistical machine translation (MT) system may use a large monolingual corpus (or, e.g., the World Wide Web ("Web")) to improve the accuracy of translated phrases/sentences. The MT system may produce alternative translations and use the large monolingual corpus (or the Web) to (re)rank the alternative translations.

The MT system may receive an input text segment in a source language, compare alternate translations for said input text string in a target language to text segments in the large monolingual corpus in the target language, and record a number of occurrences of the alternate translations in the large monolingual corpus. The MT system may then re-rank the alternate translations based, at least in part, on the number of occurrences of each translation in the corpus.

The MT system may build a finite state acceptor (FSA) for the input text string which encodes alternative translations for the input text string in the target language.

DETAILED DESCRIPTION

Figure 1:
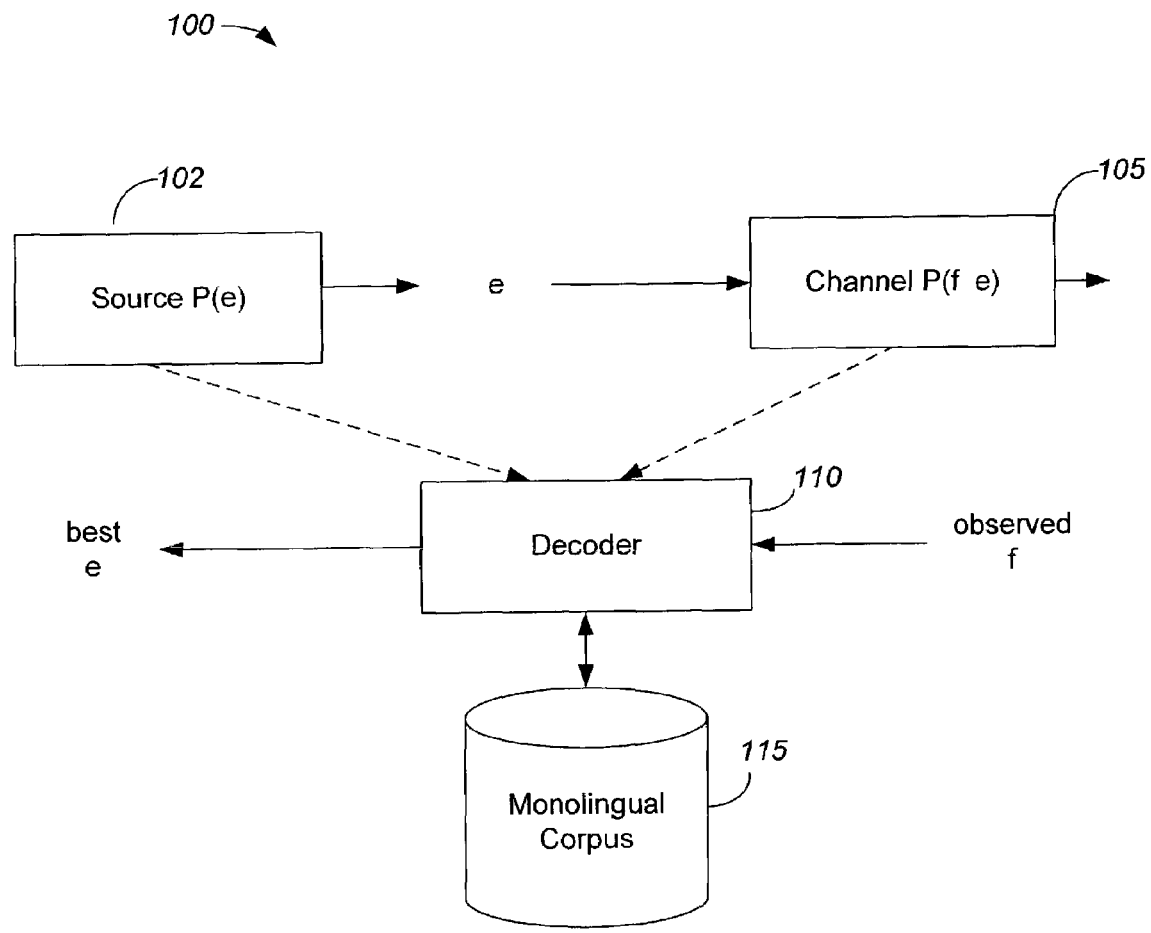
FIG. 1 is a block diagram of a statistical machine translation system.

FIG. 1 illustrates a statistical machine translation (MT) system according to an embodiment. The MT system 100 may be used to translate from a source language (e.g., French) to a target language (e.g., English). The MT system 100 may include a language model 102, a translation model 105, a decoder 110, and a large monolingual corpus 115.

The MT system 100 may use the large monolingual corpus 115 (or, e.g., the World Wide Web ("Web")) to improve the accuracy of translated phrases/sentences. The MT system 100 may produce alternative translations and use the large monolingual corpus (or the Web) to (re)rank the alternative translations. For example, the French sentence "elle a beaucoup de cran" may be translated by the MT system 100 as both "she has a lot of guts" and "it has a lot of guts", with similar probabilities. Given that "she has a lot of guts" is found more often in a large monolingual English corpus (or on the Web), its score increases significantly and the translation becomes the higher ranked.

The MT system 100 may be based on a source-channel model. The language model (the source) provides an a priori distribution P(e) of probabilities indicating which English text strings are more likely, e.g., which are grammatically correct and which are not. The language model 102 may be an n-gram model trained by a large, naturally generated monolithic corpus (e.g., English) to determine the probability of a word sequence.

The translation model 105 may be used to determine the probability of correctness for a translation. The translation model may be, for example, an IBM Model 4, described in U.S. Pat. No. 5,477,451. The IBM Model 4 revolves around the notion of a word alignment over a pair of sentences, such as that shown in FIG. 2. A word alignment assigns a single home (English string position) to each French word. If two French words align to the same English word, then that English word is said to have a fertility of two. Likewise, if an English word remains unaligned-to, then it has fertility zero. If a word has fertility greater than one, it is called very fertile.

Figure 2:
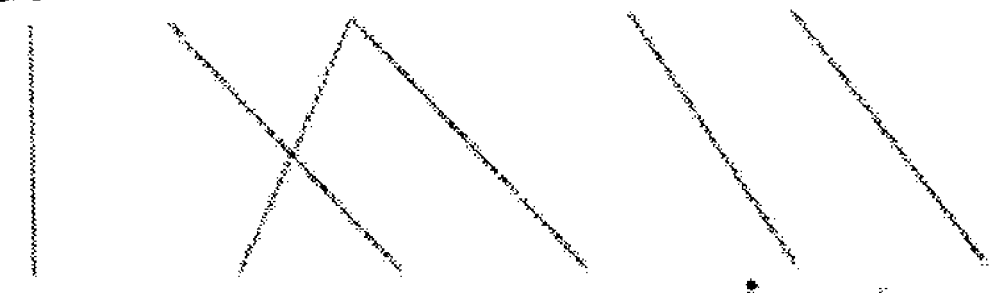
FIG. 2 shows a word alignment between parallel phrases.
Figure 3:
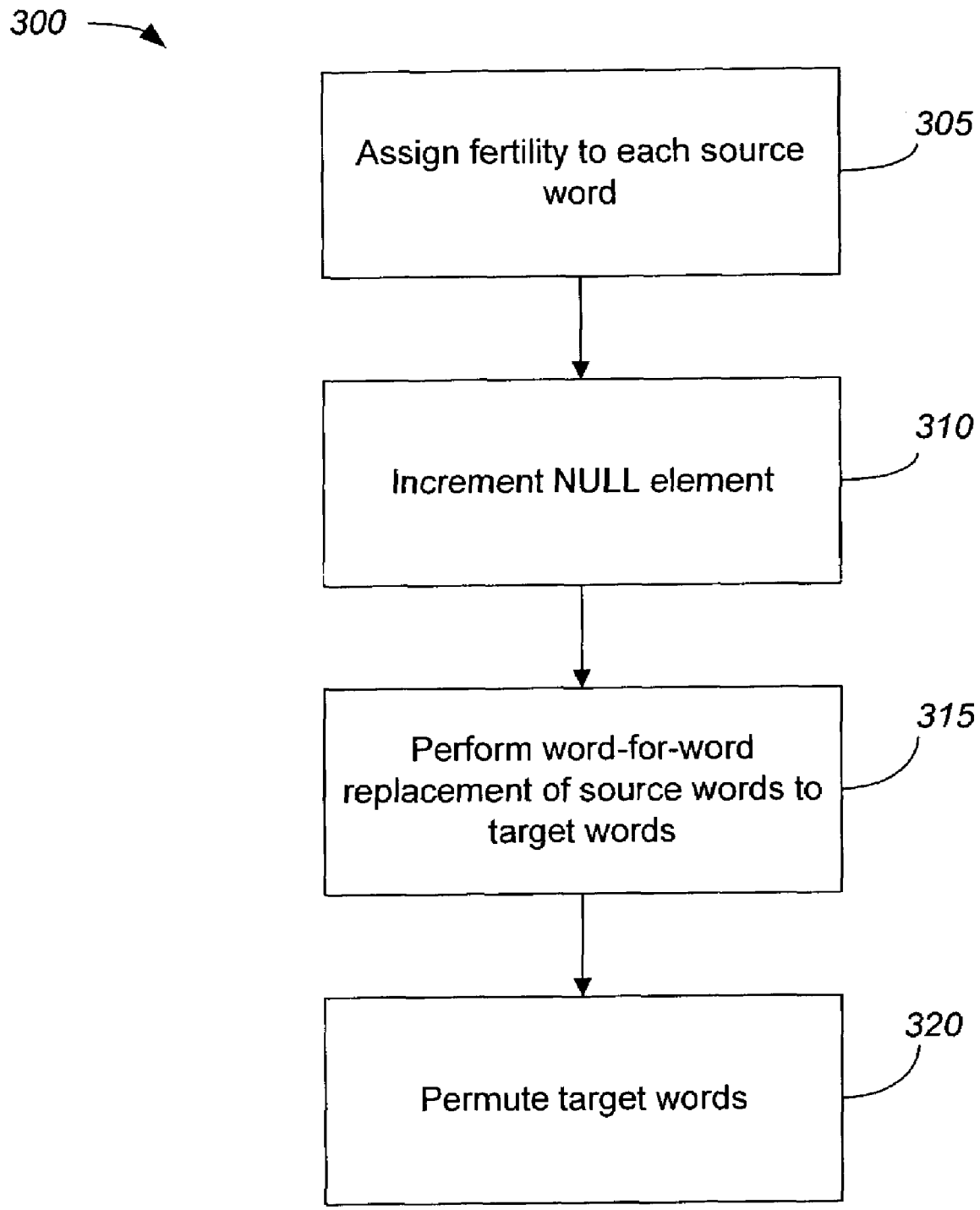
FIG. 3 is a flowchart describing a stochastic process by which a source language string gets converted into a target language string.

The word alignment in FIG. 2 is shorthand for a hypothetical stochastic process by which an English string 200 gets converted into a French string 205. FIG. 3 is a flowchart describing, at a high level, such a stochastic process 300. Every English word in the string is first assigned a fertility (block 305). These assignments may be made stochastically according to a table n(ø|ei). Any word with fertility zero is deleted from the string, any word with fertility two is duplicated, etc. After each English word in the new string, the fertility of an invisible English NULL element with probability p1 (typically about 0.02) is incremented (block 310). The NULL element may ultimately produce "spurious" French words. A word-for-word replacement of English words (including NULL) by French words is performed, according to the table t(fj|ei) (which together form a translation table, or T-table) (block 315). Finally, the French words are permuted according to certain distortion probabilities (block 320). In permuting, IBM Model 4 distinguishes between French words that are heads (the leftmost French word generated from a particular English word), non-heads (non-leftmost, generated only by very fertile English words), and NULL-generated.

For any given input French sentence, the translation model may compute a large list of potential English translations (e.g., of order $10^{300}$ or even larger). From a computer science perspective, the problem we are trying to solve is simple: we are interested in determining the number of occurrences of a set of strings/translations $\{t_1, t_2, \ldots, t_n\}$ in a large sequence/corpus S. When n and S are small, this is a trivial problem. Unfortunately, for large n, the problem becomes extremely challenging. In the framework of IBM Model 4 we start with an English string and perform several steps to probabilistically arrive at a French string. When translating/decoding, the system may perform the steps described in FIG. 3 in reverse order to obtain the English strings that may have produced the French sentence.

Assume that we are interested in representing compactly all English translations of the French phrase "un bon choix". Since French and English have different word orders, the system must first to generate all possible permutations of the French words. In an embodiment, the system may use a finite state device to perform this task.

Figure 4:
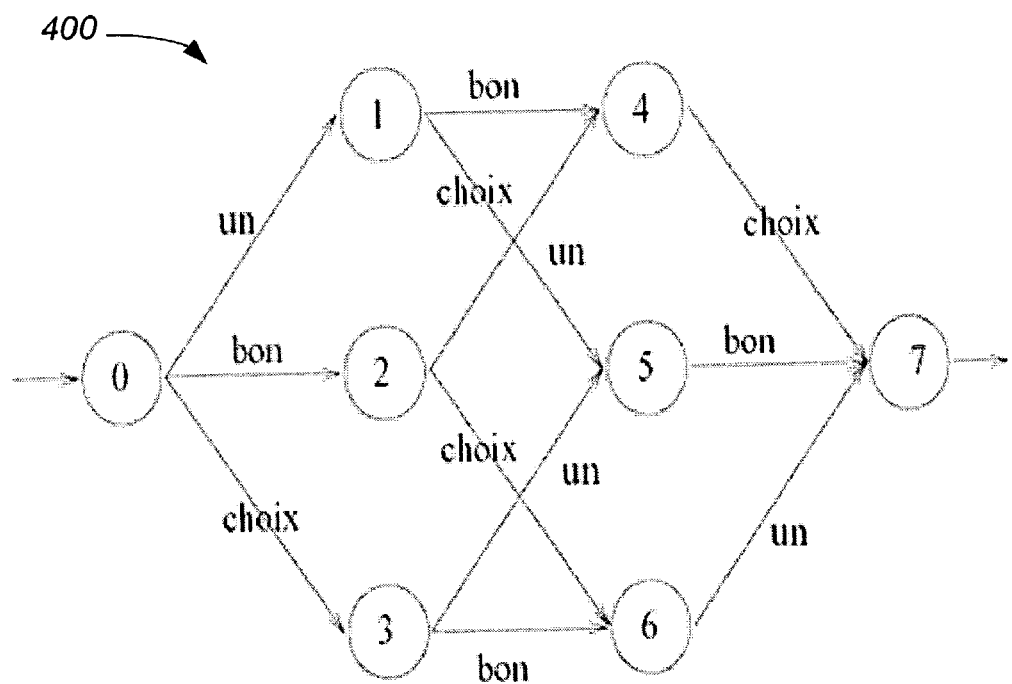
FIG. 4 is a block diagram of a finite state acceptor.

Finite state acceptors (FSAs) and finite state transducers (FSTs) are two types of finite state devices. An FSA is a network of states and transitions. Each transition has a label. A string is an ordered sequence of symbols drawn from a finite vocabulary. An FSA accepts a string $w_1, w_2 \ldots w_n$ if you can trace a path from the start state to the final state along transitions labeled $w_1, w_2, \ldots w_n$. An exemplary FSA 400 for the French phrase "un bon choix" is shown in FIG. 4.

An FSA can only accept or reject a string. An FST can transform one string into another. There are many applications of transductions in natural language, e.g., transforming strings of letters into strings of phonemes (sounds), or word strings into part-of-speech strings (noun, verb, etc.). An FST is just like an FSA, except the transitions have both an input label and an output label. An FST legally converts one string $w_1, w_2, \ldots w_n$ into another string $x_1, x_2, \ldots, x_m$ if there is a path through the FST that allows you to trace the first string using input labels and (simultaneously) the second string using output labels.

Figure 5:
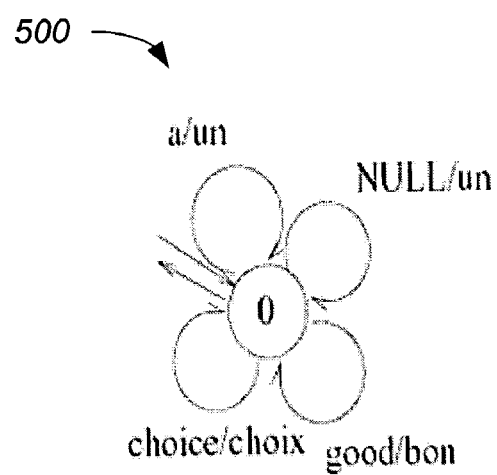
FIG. 5 is a block diagram of a finite state transducer.
Figure 6:
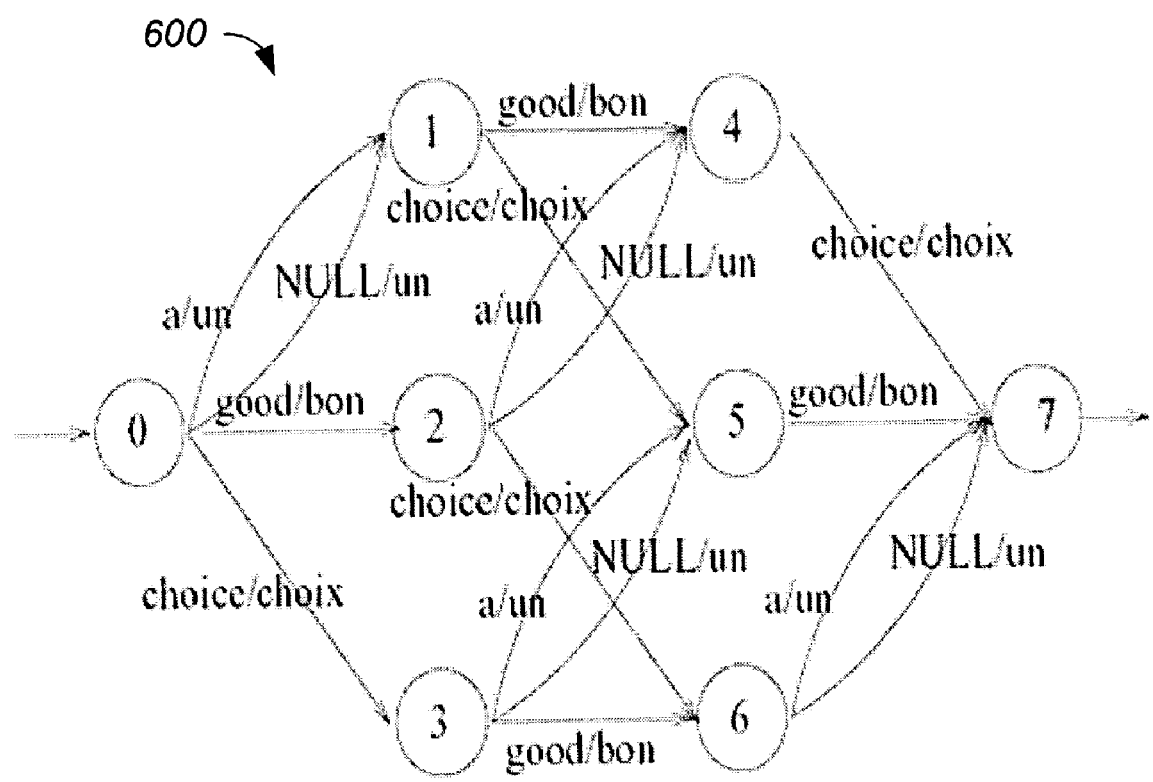
FIG. 6 is block diagram of a finite state acceptor.
Figure 7:
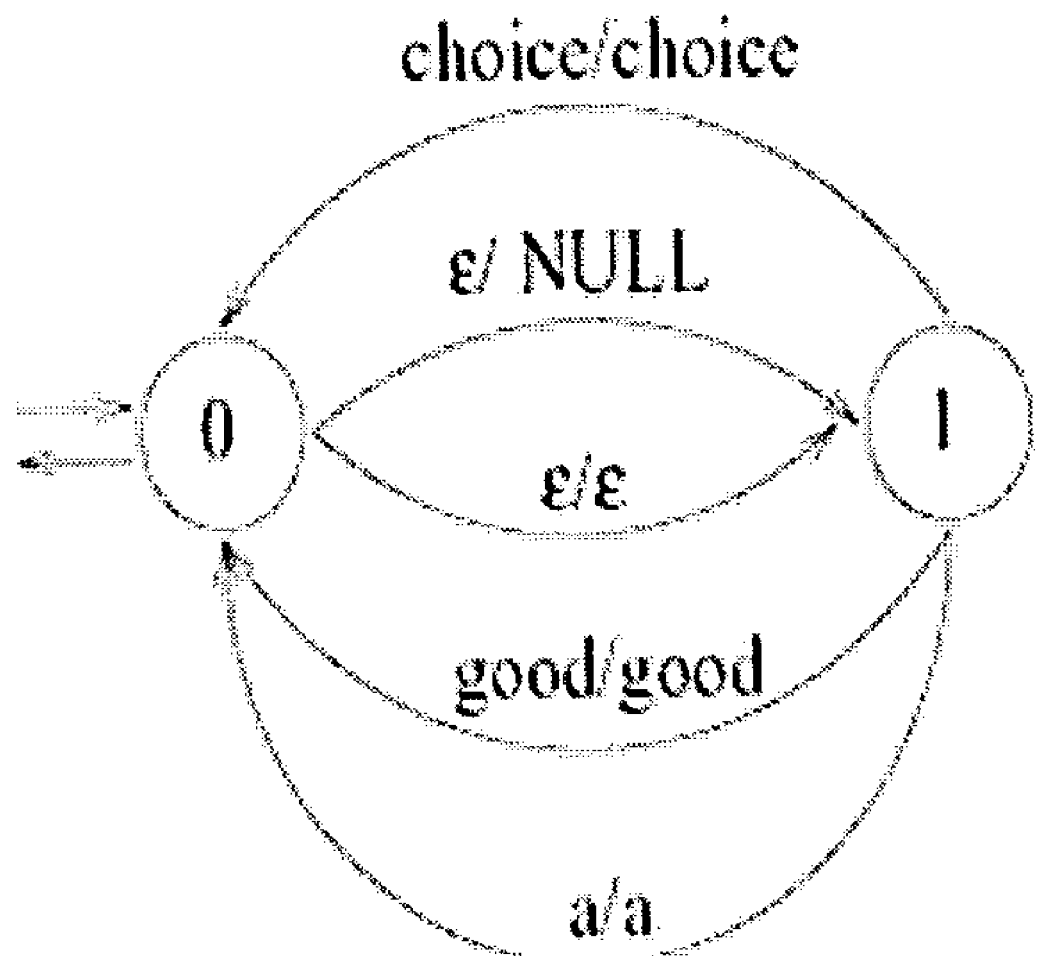
FIG. 7 is a block diagram of a finite state machine which may be used to model the NULL word insertions.

The mapping between French and English words is often ambiguous. When translating from French into English, we can translate "un" as "a", "an", or even as NULL. We can build an FST to take into account the multiple translation possibilities. Given that we actually build probabilistic transducers, the probabilities associated with these possibilities can be incorporated. The T-table can be used to build a simple transducer: it has only one state and has one transition for each entry in the T-table (a simplified FST 500 is shown in FIG. 5). Composing the FST 500 with the FSA 400 results in an FSA 600 modeling both the different word order and the word translation ambiguity phenomena, as shown in FIG. 6. The situation becomes more complicated as one has to add new transducers for the other steps discussed in FIG. 3. For example, the French phrase "un bon choix" can be translated as "good choice" in English. The finite state model accomplishes this by considering the word "un" to be the translation of a NULL English word. A simple two-state automaton may be used to model the NULL word insertions, as shown in FIG. 7.

Finally, fertility also needs to be modeled by an FSA. In FIG. 2, for example, the English word "not" is mapped into both "ne" and "pas". This can be simulated by using the fertility 2 of "not" to first multiply it (i.e., create "not not" on the English side), and then translating the first one as "ne" and the second one as "pas". A simple FSA can be used to model word fertilities.

For a given French sentence f, the final result of these operations is a non-deterministic FSA with epsilon transitions, which will be referred to as $FSA^0_f$. For a 6-word French sentence f such as "elle me a beaucoup appris .", an FSA may have 464 states, 42139 arcs, and takes 1,172 Kbytes. The total number of paths (without cycles) is 10,328. There are a number of advantages to this representation. $FSA^0_f$ enumerates all possible English translations of f (according to the translation model). $FSA^0_f$ also reflects the goodness of each translation $e_i$ as assessed by the statistical model used to generate it. Furthermore, $FSA^0_f$ can be used as a binary classifier for English strings/translations ("yes" if string e is a possible translation of f; "no" otherwise).

A finite state machine built in this manner operates as a rudimentary statistical machine translation system. Given a French sentence f, it can output all its English translations $e_i$ and their IBM Model 4 translation probabilities (modulo distortion probabilities).

In the previous section, we have shown how to automatically build, for a given French sentence, a finite state acceptor FSAY that encodes all possible English translations of f. The next step is to use FSAY to find all the occurrences of the possible English translations of f in a large monolingual corpus. In order to be able to perform the string matching operations, the monolingual corpus may be modified such that all the English words unknown to $FSA^0_f$ are replaced by UNK in the monolingual corpus. The acceptor $FSA^0_f$ needs also to be slightly modified to account for the UNK token. The resulted acceptor will be referred to as $FSA^1_f$.

Figure 8:
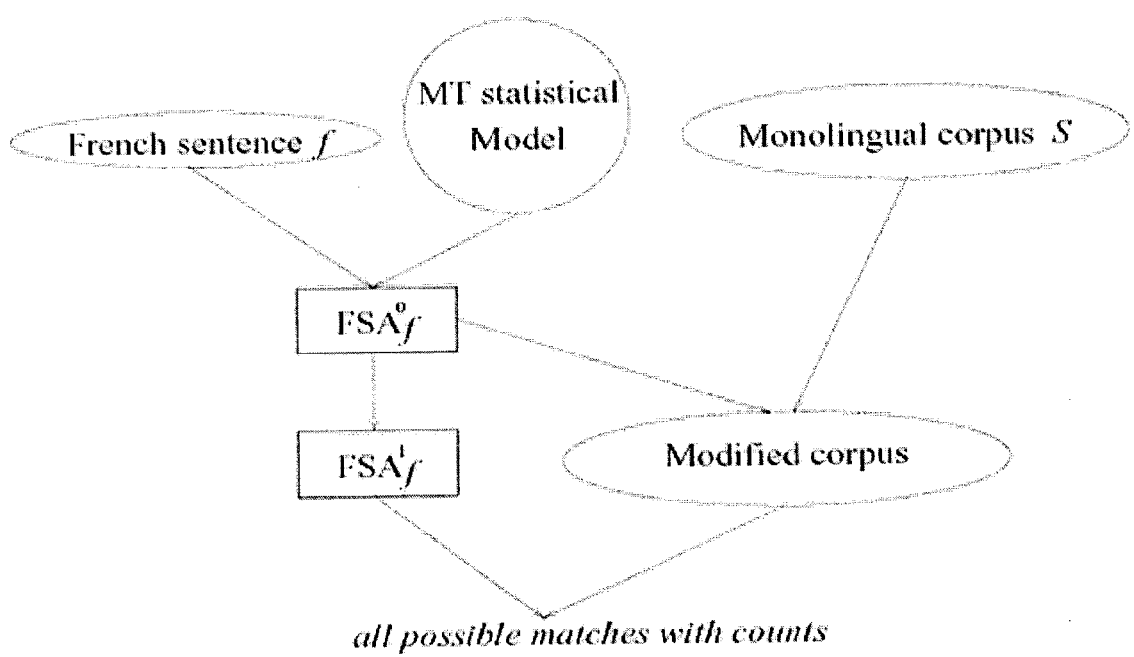
FIG. 8 is a flow diagram describing a machine translation operation.

A summary of all the operations is presented in FIG. 8. From a French sentence f, using the parameters of a statistical translation model, a finite state acceptor $FSA^0_f$ is built. $FSA^0_f$ is further modified to yield $FSA^1_f$. A large English corpus is taken sentence by sentence and modified such that all English words not known by FSAY are replaced by UNK. Each modified sentence is matched against $FSA^1_f$ and for each sentence accepted by $FSA^1_f$, the system stores the string matched, and also keeps a count of each appearance. The result is all possible translations of f that also occur in the corpus S, and their counts. The number of observed translations of f decreases from an order of magnitude of $10^{300}$ as proposed by the translation model to an order of magnitude of $10^3$-$10^6$.

A possible source of failure for the system is related to the corpus S. This may occur when the system fails to find any such possible translation, returning zero proposed translations. This type of failure has several possible fixes. One is to keep increasing the size of the corpus S, e.g., beyond 1 billion words of magnitude. This may give the system an increased chance of finding good translation proposals. Another possible fix is to incorporate the system with other translation methods into a multi-engine system which combines the strengths of each individual method. Another possible approach to fixing this type of failure is to find a reliable mechanism for splitting up sentences into "independent" sub-parts, such as clauses, or elementary textual units, and then translate the sub-parts individually. This approach may also allow for the system to scale up to longer sentences without loosing much in the translation accuracy.

Parallel corpora are expensive resources that are time-consuming to build by humans, but are crucial for building high-performance statistical machine translation systems. In an embodiment, the system may be used to automatically construct parallel corpora. New phrase/sentence pairs aligned by the system can be extracted and used for training in order to improve the estimates of the parameters of a statistical model.

In an alternative implementation, potential translations generated with the translation model with the highest probability of being a correct translation may be compared against the large monolingual corpus and then re-ranked based on the frequency of occurrences in the corpus. For example, the Internet may be used as a source for the monolingual corpus, and the top potential translations may be used as an input to a search engine, which may search the Internet for electronic documents in the target language including exact matches for the input text string.

A number of embodiments have been described. Nevertheless, it will be understood that various modifications may be made without departing from the spirit and scope of the invention. For example, blocks in the flowcharts may be skipped or performed out of order and still produce desirable results. Accordingly, other embodiments are within the scope of the following claims.

The invention claimed is:

1. A method comprising:
   receiving an input text string in a source language;
   generating a plurality of alternate translations for said input text string in a target language using a language model;
   assigning a probability score to at least a portion of said plurality of alternate translations using the language model;
   comparing said scored plurality of alternate translations for said input text string in said target language to text segments in a monolingual corpus in the target language; and
   recording a number of occurrences in said monolingual corpus of each of said scored plurality of alternate translations.

2. The method of claim 1, further comprising:
   selecting at least a portion of said plurality of alternate translations based on the probability scores.

3. The method of claim 1, further comprising:
   ranking the scored alternate translations based on the probability scores.

4. The method of claim 3, further comprising:
   re-ranking the ranked alternate translations based on the recorded number of occurrences.

5. The method of claim 4, further comprising:
   training a statistical machine translator using said re-ranked alternate translations.

6. The method of claim 4, further comprising:
   building parallel corpora in the source language and the target language using said re-ranked alternate translations.

7. The method of claim 1, further comprising:
   building a finite state acceptor for the input text string operative to encode a plurality of alternate translations for said input text string in the target language.

8. The method of claim 7, wherein said comparing the plurality of alternate translations to text segments in the monolingual corpus comprises inputting text segments in the monolingual corpus to the finite state acceptor.

9. The method of claim 1, further comprising:
   deriving the monolingual corpas from a collection of documents.

10. The method of claim 1, further comprising:
    deriving the monolingual corpus from text on World Wide Web.

11. A method comprising:
    receiving an input text string in a source language;
    building a finite state acceptor for the input text string operative to encode a plurality of alternate translations for said input text string in a target language;
    inputting text segments in a monolingual corpus to the finite state acceptor;
    recording text segments accepted by the finite state acceptor; and
    recording a number of occurrences for each of said accepted text segments.

12. The method of claim 11, further comprising:
    ranking each of the accepted text segments based at least in part on the number of occurrences.

13. The method of claim 12, further comprising:
    identifying a probability for each of the accepted text segments; and
    ranking the accepted text segments at least in part on the probabilities.

14. An apparatus comprising:
    a translation model component operative to receive an input text string in a source language, generate a plurality of alternate translations for said input text strings using a language model, and assign a probability score to at least a portion of said plurality of alternate translations using the language model, the alternate translations comprising text segments in a target language;
    a corpus comprising a plurality of text segments in the target language; and
    a translation ranking module operative to record a number of occurrences of said scored alternate translations in the corpus.

15. The apparatus of claim 14, wherein said translation model component is operative to generate a finite state acceptor encoding the plurality of alternate translations.

16. The apparatus of claim 14, further comprising:
    wherein the corpus comprises documents available on the World Wide Web.

17. An article comprising a machine-readable medium including machine-executable instructions, the instructions operative to cause the machine to:
    receive an input text string in a source language;
    generate a plurality of alternate translations for said input text string in a target language using a language model;
    assign a probability score to at least a portion of said plurality of alternate translations using the language model;
    compare said scored plurality of alternate translations for said input text string in the target language to text segments in a monolingual corpus in the target language; and
    record a number of occurrences in said monolingual corpus of each of at least a plurality of said scored plurality of alternate translations.

18. An article comprising a machine-readable medium including machine-executable instructions, the instructions operative to cause the machine to:
    receive an input text string in a source language;
    build a finite state acceptor for the input text string operative to encode a plurality of alternate translations for said input text string in a target language;
    input text segments in a monolingual corpus to the finite state acceptor; and
    record text segments accepted by the finite state acceptor; and
    record a number of occurrences for each of said accepted text segments.

19. The article of claim 18, further comprising instructions operative to cause the machine to:
    rank each of the accepted text segments based at least in part on the number of occurrences.

* * * * *